(12) United States Patent
Hefnawy

(10) Patent No.: US 6,514,547 B1
(45) Date of Patent: *Feb. 4, 2003

(54) HYDRATABLE GRANULAR SOUP OR SAUCE PRODUCT

(75) Inventor: M. Magdy Hefnawy, Randolph, NJ (US)

(73) Assignee: Bestfoods, Englewood Cliffs, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/200,274

(22) Filed: Nov. 24, 1998

Related U.S. Application Data

(63) Continuation-in-part of application No. 09/074,714, filed on May 8, 1998, now abandoned.

(51) Int. Cl.⁷ .................................................. A23L 1/39
(52) U.S. Cl. ........................... 426/96; 426/99; 426/103; 426/589
(58) Field of Search ........................... 426/89, 96, 589, 426/103, 99

(56) References Cited

U.S. PATENT DOCUMENTS

| | | | |
|---|---|---|---|
| 3,615,647 A | * 10/1971 | Kassens | 426/92 |
| 3,949,096 A | * 4/1976 | Johnson et al. | 426/302 |
| 3,987,207 A | * 10/1976 | Spaeti et al. | 426/99 |
| 4,353,927 A | * 10/1982 | Lovercheck | 426/101 |
| 4,565,708 A | * 1/1986 | Blake et al. | 426/579 |
| 4,568,551 A | * 2/1986 | Seewi et al. | 426/99 |
| 4,693,900 A | 9/1987 | Molinari | 426/128 |
| 4,704,294 A | * 11/1987 | Rakosky | 426/578 |
| 4,828,857 A | * 5/1989 | Sharma et al. | 426/285 |
| 4,844,938 A | * 7/1989 | Amamoto et al. | 426/589 |
| 4,933,192 A | * 6/1990 | Darling et al. | 426/98 |
| 5,021,248 A | * 6/1991 | Stark et al. | 426/96 |
| 5,122,385 A | * 6/1992 | Daher et al. | 427/3 |
| 5,126,151 A | * 6/1992 | Bodor et al. | 426/99 |
| 5,128,166 A | 7/1992 | Babines et al. | 426/557 |
| 5,258,196 A | 11/1993 | Lohan et al. | 426/560 |
| 5,356,642 A | 10/1994 | Patterson et al. | 426/93 |
| 5,360,614 A | * 11/1994 | Fox et al. | 424/439 |
| 5,436,015 A | 7/1995 | Patterson et al. | 426/94 |
| 5,492,711 A | 2/1996 | Stengel | 426/557 |
| 5,718,969 A | * 2/1998 | Sewall et al. | 428/304.4 |
| 5,897,896 A | * 4/1999 | Thomas | 426/94 |

OTHER PUBLICATIONS

U.S. Standard Sieve Sizes, Prokon Calculator, Software Version 8.6, ShowMe Software, Jefferson City, MO, copyright 97–98, 1998.*

"Flavor Encapsulation", Chapter 17 by Jones, pp. 158–176.

* cited by examiner

*Primary Examiner*—Arthur L. Corbin

(57) ABSTRACT

A hydratable granular food product which can be used to make soups and sauces and which does not require stirring before or during cooking. The product is comprised of granules which are hydrophobic and hydrophilic and do not tend to form clumps when cold or ambient water or milk is added. At least about 90% of the granules have a size from about 1000 microns to about 175 microns and have an outer coating which contains an emulsifier. In a particularly preferred application, the granular food product can be admixed with a carbohydrate such as pasta and then hydrated together with the pasta to make a ready-to-eat pasta and sauce.

7 Claims, No Drawings

HYDRATABLE GRANULAR SOUP OR SAUCE PRODUCT

CROSS-REFERENCE TO RELATED APPLICATION

This application is a continuation-in-part of Ser. No. 09/074,714 filed May 8, 1998 now abandoned.

BACKGROUND OF THE INVENTION

1. Field of the Invention

The present invention has to do with hydratable granular food products and methods for their production. In particular, the invention relates to hydratable sauces and soups which do not tend to form clumps when milk or water is added. The products of the invention generally do not require stirring before or during cooking and require minimal or no stirring following cooking to obtain a uniform homogenous product. When sauces of the invention are rehydrated in the presence of carbohydrates such as potatoes, pasta, rice and the like, however, some stirring is recommended before and after cooking.

2. The Related Art

Presently available hydratable food products require stirring when water or milk is added in order to disperse the dry particles in the liquid before cooking. Stirring also is required during cooking. For example, in a microwave application the product must be removed from the oven and stirred thoroughly at least once before it is completely cooked and then it is stirred again following cooking.

When thick food products such as hydrated sauces are cooked with other ingredients, the thickening agents, starches, gums and the like, usually cause lumps unless vigorous stirring is applied during cooking. This problem is more manifested if the hydrated sauces are prepared with carbohydrate ingredients such as pasta, potatoes, rice and the like. These problems are minimized or avoided when sauces according to the present invention are employed.

All percentages and ratios set forth herein are by weight/weight unless specifically designated otherwise.

SUMMARY OF THE INVENTION

The granular food product of the invention is hydratable to make sauces, soups or similar food products. The product is in the form of granules wherein more than about 90%, preferably more than about 98% have a particle size from about 1000 microns to about 175 microns (i.e. from about 18 to about 80 mesh based on the United States Standard [ASTME 11–61] ("USS") sieve system). In other words, more than about 90%, preferably more than about 98%, pass through an 18 mesh sieve and are retained on an 80 mesh sieve.

The granules are both hydrophilic and hydrophobic. The hydrophobic characteristic causes the particles to disperse when water or milk is added but it does not prevent the absorption of the water or milk because the particles also retain their hydrophilic character. This is contrasted with prior art hydrophilic dry mixes which absorb water rapidly and form clumps which must be physically dispersed by agitation or mixing.

Various ingredients can be employed to make the granular product depending upon the desired flavor and end use. An essential ingredient, however, is an emulsifier such as lecithin, mono or diglycerides or other food grade emulsifiers which are capable of imparting hydrophilic characteristics to the granules. Accordingly, the granular product of the invention can contain from about 2% to about 55%, preferably from about 18% to about 35%, fat or fat substitutes or a combination thereof. Other ingredients can include crystalline ingredients such as sugar, salt, citric acid and substitutes therefor; dairy ingredients such as dry milk, cheeses, cream powders and the like; spices, natural and artificial flavors, and thickening agents such as starches (native, modified, waxy, etc.) and vegetable gums.

As a first step, all of the ingredients, except for the heat sensitive ingredients and binders, are mixed in a high shear or fluid bed mixer to make a dry mixture. The dry mixture then is heated to the melting point of the fat component or up to about 3° C. above the melting point, and then it is coated with a first binder composition to make a first particulate composition. The first binder composition is applied by spraying during mixing using it conventional means such as a high shear mixer or a fluidized bed. Spraying is conducted through a conventional nozzle. The size of the nozzle orifices will determine the size of the droplets and, accordingly, product particle size. The temperature in the fluidized bed is maintained at from about 20° C. to about 50° C.

The first binder composition is water or an aqueous solution which can contain as ingredients from about 0% to about 35% of soluble starch, 5–20 D.E. maltodextrin, dextrose, sugar (sucrose) or salt or any combination of two or more than two of such ingredients.

Following the formation of particulates with the first binder, the first particulate composition is dried to a moisture content of from about 2% to about 6% at a temperature from about 350° C. to about 60° C. using fluidized drying or drying under a vacuum to make a dried first particulate composition.

The dried first particulate composition is cooled using cool air or a cold jacketed mixer to ambient temperature or from about 15° C. to about 40° C. and then the heat sensitive ingredients such as natural and artificial flavors, spices and protein compounds (e.g., albumin, globulin, egg protein or whey protein concentrate) are added and mixed therewith for from about 1 to 3 minutes using a fluid bed, impeller/chopper or similar mixer. Following mixing, a second binder is applied in the same manner as the first binder. The second binder is comprised of: (1) the emulsifier and, (2) an oil and/or another first binder composition.

After the particles are coated with the second binder, they are a hydratable granular product ready for use to make a sauce or soup according to the invention. The granular product is hydrated by adding milk or water and then heating to form a uniform suspension. Before hydration, the granular product can be added to other foods, for example, pasta, potatoes, vegetables or the like. Then water is added and all of the contents are heated to prepare a ready-to-eat food in a sauce.

DETAILED DESCRIPTION OF THE INVENTION

In a preferred embodiment of the invention, the granular product is employed to make a sauce for a carbohydrate food material such as pasta, potatoes, rice, cous cous, burghel or the like. In a particularly preferred application, the granular product is added to a container with microwaveable pasta. The consumer simply adds water, gently stirs, heats in a microwave oven to cook, and gently stirs the cooked product before eating.

Sauces and soups according to the invention can be made in a broad variety of flavors and textures, as long as the principles of the invention are followed as to processing conditions and the use of a second binder which provides a granulated product having the desired hydrophobic and hydrophilic characteristics. As described above, the desired hydrophobic and hydrophilic characteristics means the granular product does not tend to form clumps when water or milk at a temperature from about 5° C. up to about 100° C. is added. Stirring is not required before or during cooking and minimal or no stirring is required after cooking to obtain a uniform homogenous sauce or soup. In normal use, water or milk from the refrigerator at a temperature from about 5° C. to about 15° C. or ambient water at a temperature from about 15–30° C. is employed and the granular product does not tend to form clumps in this temperature range from about 5° to about 30° C.

Granule size is important to achieve the objectives of the invention because too many fine particles causes clumps and too many large particles increases the time required for hydration. A few particles that are too big or too small can be tolerated, however, as long as more than about 90%, preferably more than about 98%, have a particle size in a range from about 1000 microns to about 175 microns. This means that more than about 90%, preferably more than about 98% of the particles, by weight, pass through a USS #18 mesh sieve and are retained on a USS #80 mesh sieve.

Various ingredients can be used to make the granular product of the invention depending upon the desired flavor and texture of the sauce or soup to be prepared when the granules are hydrated. Some of these ingredients may have their own hydrophilic or hydrophobic characteristics and this can affect the composition of the second binder and the amount of second binder required to obtain granules having the desired characteristics. Accordingly, while an emulsifier is always required as an ingredient of the second binder, the other ingredients can be, for example, water if the granules do not need any additional ingredients to impart hydrophobic characteristics. This easily can be determined by one skilled in the art based on the guidance provided herein and the known characteristics of ingredients of the granular product. Small scale routine experiments can be conducted to optimize the hydrophobic and hydrophilic characteristics of the granular product.

The granular product of the invention is made by first preparing a dry mix of desired ingredients with from about 2% to about 55%, preferably from about 18% to about 35%, fat or fat substitutes (the percentages being based on total weight of the end product, i.e., the granular product of the invention) or a combination thereof. Suitable fats are commercially available, food grade, fat powders. The desired ingredients can include crystalline ingredients such as sugar, salt, citric acid and substitutes therefor; dairy ingredients such as dry milk, cheeses, cream powders and the like; spices, natural and artificial flavors, thickening agents such as starches (native, modified, waxy, etc.) and vegetable gums and the like and any combination of the foregoing.

A mixing vessel such as a high shear or fluid bed mixer is used to make a dry mixture by admixing the fat component with all of the remaining ingredients except for the binders and heat sensitive ingredients (i.e. natural and artificial flavors, spices and protein compounds).

The dry mixture is heated to about the drop point of the fat component, i.e. to the melting point or a temperature up to about 3° C. higher than the melting point, and then it is sprayed with a first binder solution to make a first particulate composition.

Forming particulates with the first binder solution is accomplished by spraying through a nozzle during mixing using conventional vessels for this purpose such as a high shear mixer or a fluidized bed mixer. Suitable high shear mixers include the continuous Schugi mixers available from Hosokawa Bepex Corporation, Minneapolis, Minn., USA and the Zanchetta mixer available from Zanchetta & C.s.r.L., Lucca, Italy. Suitable fluidized bed mixers are the Glatt fluidized bed available from Glatt Air Techniques, Inc., Ramsey, N.J., USA and the Niro Aeromatic available from Niro Aeromatic, Boehum, Germany. These vessels are known in the art and described in the literature. For example, use of the fluidized bed for granulating and drying is described in *FLAVOR ENCAPSULATION,* Chapter 17 by Jones, David M., *Controlling Particle Size and Release Properties,* pages 158–176, Copyright 1988, American Chemical Society, Washington, D.C., ACS Symposium Series 370, edited by Risch, Sara J. and Reineccius, Gary A.

The first binder is water or an aqueous solution which can contain as ingredients from about 0% to about 35% of soluble starch (e.g., any soluble modified food starch), 5–20 dextrose equivalent ("D.E.") maltodextrin, dextrose, sugar (sucrose) or salt or any combination of two or more of such ingredients.

The amount of the first binder composition employed, including the water, is from about 1% to about 50%, preferably from about 10% to about 30% by weight of first binder based on total weight of the granular product of the invention.

As an example of the invention, when a fluidized bed is used to spray the first binder on the dry mixture, the binder is sprayed through a nozzle in the fluidized bed as the dry mixture is fluidized in the vessel. The orifices in the nozzle are sized so that droplets of the desired size are formed and this determines the particle size of the first particulate composition. The temperature in the fluidized bed is maintained at from about 20° C. to about 50° C. depending upon the melting point of the fat component, the objective being to keep the temperature close to the drop point to enhance binding.

The first particulate composition is dried to a moisture content of from about 2% to about 6% at a temperature from about 35° C. to about 60° C., preferably using fluidized drying or drying under a vacuum to make a dried first particulate composition.

Using cool air or a cold jacketed mixer, the dried first particulate composition is cooled to ambient temperature or from about 15° C. to about 40° C. Then the heat sensitive ingredients such as natural and artificial flavors, spices and protein compounds are admixed with said particulate composition. This is generally done in mixing vessel such as a fluid bed or impeller/chopper for from about 1–3 minutes. Following mixing, a second binder composition is coated on the particles by spraying through a nozzle in a fluidized bed or a high shear mixer, in the same manner as the application of the first binder composition.

The second binder composition is a solution comprised of two components. The first component is comprised of a food grade oil and/or a binder such as the first binder composition defined herein. Suitable food grade oils are those having a low linolenic acid content such as corn oil, cottonseed oil, peanut oil, olive oil and the like. Higher linolenic acid oils such as soybean oil are not recommended because they can become rancid quickly when they are sprayed. Suitable first binder compositions are all of those identified herein and they can be the same or different than the first binder composition used to prepare the first particulate composition of the invention. The second component of the second binder composition is a food grade emulsifier such as lecithin, mono or diglycerides or combinations thereof. The ratio of the first component to the second component is from about 1:0.25 to about 1:1 and the amount employed is from about 0.2% to about 2.5% based on total weight of the end product (i.e., the granular product of the invention). After the particulate composition has been coated with the second binder, it is a granulated product ready for use to make a sauce or a soup according to the invention. In some cases, if too many oversize granules are produced, all of the product is sieved through a USS #10 sieve before use according to the invention. Further sieving may be done, if necessary, but no sieving should be needed once the processing conditions have been optimized.

Some examples of the invention are set forth below.

EXAMPLES

Examples 1–2

The following ingredients were employed to make sauces for pasta and the amounts are expressed by weight in pounds.

| Base Ingredients | Example 1 | Example 2 |
|---|---|---|
| Fat Powder | 26.120 | 27.070 |
| Tomato Powder | 0.000 | 0.000 |
| Sugar | 0.000 | 0.000 |
| Starch (Melojel) | 20.353 | 17.080 |
| Maltrin M150 | 4.260 | 5.000 |
| Salt | 7.660 | 7.650 |
| Wheat Flour (dried) | 3.510 | 2.600 |
| Mono and Di Glycerides | 0.451 | 0.450 |
| Flavoring Components | 34.864 | 32.051 |
| Heat Sensitive Ingredients | 2.782 | 8.099 |
| TOTAL | 100.000 | 100.000 |
| First Binder | 4.400 | 3.000 |
| Second Binder | 1.420 | 1.420 |

The fat powder employed was NDX 112-V available from Kerry Food Ingredients, Beloit, Wis., USA. The powder contains 75% partially hydrogenated soybean oil, sodium and calcium caseinate and mono and di glycerides.

The tomato powder was Hot Break or Cold Break tomato powder, or a combination thereof, available from McCormick, Baltimore, Md, USA.

The sugar was sucrose.

The starch was Melojel, a native corn starch available from National Starch, Woodbridge, N.J., USA.

The dried wheat flour was an enzyme inactivated wheat flour from Bestfoods, Heilbronn, Germany.

The mono and di glycerides was Atmos 150 from EDC Chemicals, Humko Chemical Division, Witco Corp., Memphis, Tenn., USA.

The flavoring components were spice extracts, cheese powders and the like which are not heat sensitive.

The heat sensitive ingredients were natural and artificial flavors and spices.

The first binder was a 10% aqueous solution of Maltrin M150 and the amount shown is expressed on a dry basis.

The second binder was corn oil and lecithin in a 2:1 ratio.

A Glatt Powder Coater/Granulator/Dryer Model GPCG-60 (a 60 kilogram fluidized bed apparatus, hereinafter the "apparatus") was used to produce 100 pound batches of each of the foregoing sauces.

The bowl of the apparatus was charged with the base ingredients and blended for 2 minutes to make a dry blend. The temperature of the dry blend was about 30–40° C.

The dry blend was fluidized and an aqueous solution of 10% maltodextrin M150 (available from Grain Processing Corp., Muscatine, Iowa, USA as Maltrin M150 and having a D.E. of 15) was sprayed through the nozzle of the apparatus at a concentration of 3–4.5% dry basis based on total weight of the end product to make a first particulate composition. Atomization pressure at the nozzle was 2.5–3.0 Bar and the granulation was continued for 20–35 minutes depending on the formula, product composition and batch size, as would be apparent to one skilled in the art. The nozzle employed was a 3.0 millimeter (mm) orifice nozzle provided by Glatt. The temperature of the first particulate composition was from 37° C.–40° C.

The first particulate composition was dried in the apparatus for 3–6 minutes to a maximum product temperature of 50° C. and a moisture content of 3.55–4.26%. The composition then was cooled to a temperature of about 40° C. using cool air in the apparatus.

The heat sensitive ingredients then were added to the bowl and blended for 2 minutes. Cooling was continued to maintain the temperature below about 40° C.

The particles were again fluidized and a solution of corn oil and lecithin, in a ratio of 2:1 by weight, was sprayed through the nozzle at a concentration of 1.36–1.47%. Atomization pressure was at 5.2 Bar for 1.5–2 minutes and the nozzle employed was a 1.8 mm orifice nozzle provided by Glatt. The discharged agglomerated product was at a temperature from 31–38° C.

In a scaled-up process, a Glatt Powder Coater/Granulator/Dryer Model GPCG-500 was used to produce 1000 pound batches of the same product. Granulation and blending times were sufficiently increased to obtain the same granulation and blending characteristics as in the smaller batch size process and more nozzles of the same size were employed to handle the increased throughput. All of the processing parameters were otherwise the same and the characteristics of the products were the same.

Examples 3–4

As in Examples 1 and 2, the following ingredients were employed and they were processed under the same conditions to make a granular product.

| Base Ingredients | Example 3 | Example 4 |
|---|---|---|
| Fat Powder | 33.370 | 24.950 |
| Tomato Powder | 0.000 | 0.000 |
| Sugar | 0.000 | 0.000 |
| Starch (Melojel) | 18.880 | 20.450 |
| Maltrin M150 | 4.050 | 3.880 |
| Salt | 6.430 | 2.570 |
| Wheat Flour (dried) | 2.520 | 3.720 |
| Mono and Di Glycerides | 0.460 | 0.357 |
| Flavoring Components | 27.535 | 36.962 |
| Heat Sensitive Ingredients | 6.755 | 7.111 |
| TOTAL | 100.000 | 100.000 |
| First Binder | 3.700 | 3.000 |
| Second Binder | 1.440 | 1.360 |

Examples 5–6

As in Examples 1 and 2, the following ingredients were employed and they were processed under the same conditions to make a granular product.

| Base Ingredients | Example 5 | Example 6 |
| --- | --- | --- |
| Fat Powder | 22.780 | 18.350 |
| Tomato Powder | 0.000 | 30.900 |
| Sugar | 0.000 | 5.410 |
| Starch (Melojel) | 28.060 | 11.590 |
| Maltrin M150 | 3.510 | 8.130 |
| Salt | 5.570 | 8.890 |
| Wheat Flour (dried) | 5.100 | 1.930 |
| Mono and Di Glycerides | 0.510 | 0.154 |
| Flavoring Components | 21.730 | 9.300 |
| Heat Sensitive Ingredients | 12.740 | 5.346 |
| TOTAL | 100.000 | 100.000 |
| First Binder | 4.400 | 3.000 |
| Second Binder | 1.420 | 1.470 |

Examples 7–8

As in Examples 1 and 2, the following ingredients were employed and they were processed under the same conditions to make a granular product.

| Base Ingredients | Example 7 | Example 8 |
| --- | --- | --- |
| Fat Powder | 17.761 | 16.727 |
| Tomato Powder | 29.913 | 16.727 |
| Sugar | 5.240 | 4.460 |
| Starch (Melojel) | 11.220 | 16.850 |
| Maltrin M150 | 10.430 | 7.190 |
| Salt | 8.230 | 7.430 |
| Wheat Flour (dried) | 1.870 | 2.620 |
| Mono and Di Glycerides | 0.150 | 0.000 |
| Flavoring Components | 9.034 | 9.755 |
| Heat Sensitive Ingredients | 6.152 | 18.241 |
| TOTAL | 100.000 | 100.000 |
| First Binder | 3.000 | 3.600 |
| Second Binder | 1.420 | 1.420 |

ANALYTICAL RESULTS

The granular products of Examples 1–6 and 8 were analyzed to determine various characteristics. A Powder Characteristics Tester available from Hasokawa Micron Division, 10 Chatham Road, Summit, N.J. 07901 USA was used to test Bulk Density, Angle of Repose and Compressibility and other tests were conducted with other conventional laboratory instruments. The results were as follows:

| Flavor | Example 1 Cheese-1 | Example 2 Cheese-2 |
| --- | --- | --- |
| Bulk Density | | |
| Aerated g/cc | 0.42 | 0.39 |
| Packed g/cc | 0.51 | 0.49 |
| Dynamic g/cc | 0.44 | 0.41 |
| Angle of Repose | 41.00 | 40.00 |
| Compressibility (%) | 17.60 | 20.40 |
| % Moisture | 3.93 | 4.05 |
| % Salt | 8.051 | 10.093 |
| Aw (water activity) | 0.348 | 0.319 |
| Granulation (% on USS#) | | |
| 18 | 23.00 | 8.40 |
| 35 | 56.80 | 47.40 |
| 60 | 18.20 | 37.00 |
| 80 | 1.40 | 5.60 |
| 120 | 0.00 | 1.60 |
| 170 | 0.00 | 0.00 |
| Pan | 0.00 | 0.00 |
| Mechanical Stability | 99.40 | 100.00 |

| Flavor | Example 3 Cheese-3 | Example 4 Chicken-1 |
| --- | --- | --- |
| Bulk Density | | |
| Aerated g/cc | 0.40 | 0.39 |
| Packed g/cc | 0.52 | 0.50 |
| Dynamic g/cc | 0.43 | 0.41 |
| Angle of Repose | 44.00 | 39.00 |
| Compressibility (%) | 23.10 | 22.00 |
| % Moisture | 3.55 | 4.26 |
| % Salt | 8.53 | 10.016 |
| Aw (water activity) | 0.308 | 0.328 |
| Granulation (% on USS#) | | |
| 18 | 17.00 | 12.60 |
| 35 | 52.40 | 48.20 |
| 60 | 23.80 | 34.20 |
| 80 | 5.20 | 4.80 |
| 120 | 1.00 | 0.40 |
| 170 | 0.00 | 0.00 |
| Pan | 0.00 | 0.00 |
| Mechanical Stability | 100.00 | 100.00 |

| Flavor | Example 5 Chicken-2 | Example 6 Tomato |
| --- | --- | --- |
| Bulk Density | | |
| Aerated g/cc | 0.40 | 0.42 |
| Packed g/cc | 0.53 | 0.54 |
| Dynamic g/cc | 0.43 | 0.45 |
| Angle of Repose | 39.00 | 42.00 |
| Compressibility (%) | 24.50 | 22.20 |
| % Moisture | 3.96 | 4.06 |
| % Salt | 13.091 | 10.616 |
| Aw (water activity) | 0.279 | 0.327 |
| Granulation (% on USS#) | | |
| 18 | 5.20 | 3.20 |
| 35 | 33.80 | 49.40 |
| 60 | 52.80 | 42.80 |
| 80 | 7.00 | 4.20 |
| 120 | 0.20 | 0.00 |
| 170 | 0.00 | 0.00 |
| Pan | 0.00 | 0.00 |
| Mechanical Stability | 99.00 | 100.00 |

| Flavor | Example 8 Cheese-Tomato |
|---|---|
| Bulk Density | |
| Aerated g/cc | 0.41 |
| Packed g/cc | 0.52 |
| Dynamic g/cc | 0.43 |
| Angle of Repose | 43.00 |
| Compressibility (%) | 21.10 |
| % Moisture | 4.09 |
| % Salt | 10.325 |
| Aw (water activity) | 0.319 |
| Granulation (% on USS#) | |
| 18 | 5.40 |
| 35 | 55.40 |
| 60 | 33.60 |
| 80 | 5.40 |
| 120 | 0.20 |
| 170 | 0.00 |
| Pan | 0.00 |
| Mechanical Stability | 100.00 |

What is claimed is:

1. A hydratable granular sauce or soup composition comprised of granules, said granules comprising
   (a) a first particulate composition comprised of from about 2% to about 55% of a fat component and a component selected from the group consisting of crystalline ingredients, dairy ingredients, spice extracts and thickening agents and a first binder composition comprised of water or an aqueous solution comprising a composition selected from the group consisting of starch: 5–20 D.E. maltodextrin, dextrose, sucrose and salt;
   (b) heat sensitive ingredients selected from the group consisting of natural flavors, artificial flavors, spices ad protein compounds admixed with said first particulate composition, and
   (c) a second binder composition coated on said first particulate composition and heat sensitive ingredients comprised of an emulsifier and, optionally, a component selected from the group consisting of oil, water or an aqueous solution comprising a composition selected from the group consisting of starch, 5–20 D.E. maltodextrin, dextrose, sucrose and salt, the granules having a size distribution wherein more than about 98% of the granules have a size from about 1000 microns to about 175 microns.

2. The hydratable granular sauce or soup composition of claim 1 wherein the fat component comprises a fat, a fat substitute or a fat and a fat substitute.

3. The hydratable granular sauce or soup composition of claim 1 wherein the emulsifier is present in an amount from about 0.04% to about 2.5%.

4. The hydratable granular sauce or soup composition of claim 1 wherein the granules do not tend to form clumps when water or milk at a temperature from about 5° C. to about 30° C. is added.

5. A hydrated sauce or soup comprising the hydratable granular sauce or soup composition of claim 1 and water or milk.

6. The hydratable granular sauce or soup composition of claim 1 wherein said oil is selected from the group consisting of corn oil, cottonseed oil, peanut oil, olive oil and mixtures thereof.

7. The hydratable granular sauce or soup composition of claim 1 wherein the weight ratio of said component selected from the group consisting of oil, water or an aqueous solution comprising a composition selected from the group consisting starch, 5–20 to D.E. maltodextrin, dextrose, sucrose and salt to said emulsifier in said second binder is from about 1:0.25 to about 1:1.

* * * * *